Patented May 13, 1924.

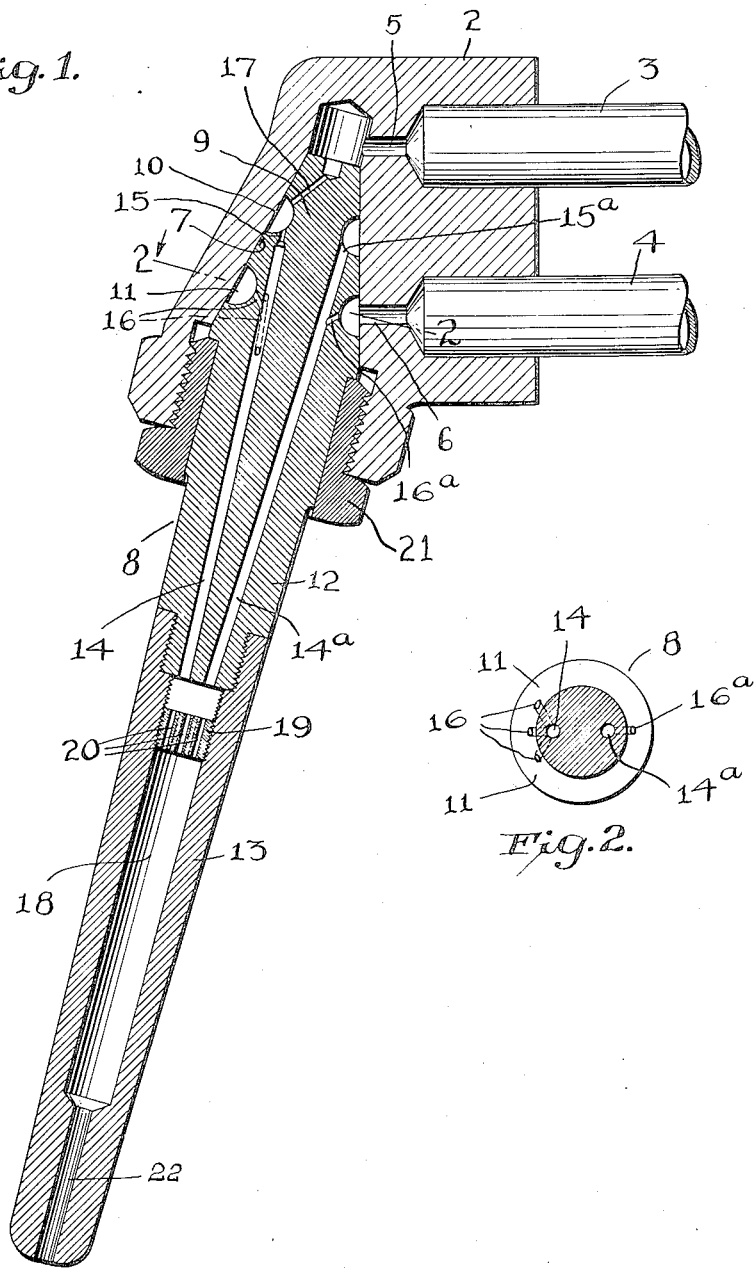

1,494,009

UNITED STATES PATENT OFFICE.

FRANCIS JOHN NAPOLITAN, OF SPRINGFIELD, MASSACHUSETTS, ASSIGNOR, BY MESNE ASSIGNMENTS, TO AIR REDUCTION COMPANY, INCORPORATED, OF NEW YORK, N. Y., A CORPORATION OF NEW YORK.

OXYACETYLENE TORCH.

Application filed April 20, 1920. Serial No. 375,198.

*To all whom it may concern:*

Be it known that I, FRANCIS JOHN NAPOLITAN, a citizen of the United States, and resident of Springfield, in the county of Hampden and State of Massachusetts, have invented certain new and useful Improvements Relating to Oxyacetylene Torches, of which the following is a specification.

The invention comprises improvements relating to oxyacetylene and like torches, the object of which is to overcome or mitigate the condition known as flashing-back. It involves the novel principle of preliminarily bringing the gases together in separate streams which are respectively so oxidizing and reducing (or carbonizing) as to be substantially non-flashing. Subsequently these streams are commingled so as to form a mixture of the desired or correct proportions for the flame (actually or theoretically one to one in the case of oxygen and acetylene for the welding flame). By maintaining a body of such explosive mixture in an enlarged mixing chamber intermediate the preliminary mixing passages and the flame exit, and accessible to the latter, a back-fire if one occurs will propagate with explosive violence in such chamber and expire, being unable to proceed up the rear passages, and the supply from these passages to the chamber being momentarily checked. The desired result may be further favored by a baffling of the gases in the mixing chamber.

In the accompanying drawing illustrating a preferred form of oxyacetylene torch embodying and for carrying out the invention:

Fig. 1 is a section through the head and tip, taken in the axial planes; and

Fig. 2 is a cross-section of the tip on the line 2—2 of Fig. 1.

The invention is particularly applicable to torches of the interchangeable, sealed mixing tip variety and in a specific aspect is an improvement therein. The body or permanent part of the torch comprises a head 2, and pipes 3 and 4 forming oxygen and acetylene supply conduits, acetylene being the typical combustible gas in these torches. These conduits are suitably valved at the rear end of the torch (not shown) and are connected by the usual flexible hose with the regulators by which the pressures are regulated. The invention has to do more particularly with torches wherein both gases are supplied under positive pressures to force them through the ports and passages in the requisite ultimate proportions for the flame; and the oxygen is preferably supplied under materially higher pressure than the acetylene for reasons of safety.

Channels 5, 6 in the head, forming the terminal portions of the supply conduits, open, respectively, into the back and side of a conical ground socket 7. The interchangeable part or tip 8 has a corresponding truncated conical rear portion 9 ground for sealing contact with the socket. This known form of seal is preferred, but others may be employed. The sealing portion of the tip has two circumferential grooves 10, 11, which improve the seal and form part of the passageway for the gases. The forward groove 11 is positioned to communicate with the acetylene channel 6. A nut 21 serves to hold the tips in place with sealing pressure.

For convenience in manufacture the tip may be made in two pieces 12, 13, as shown, permanently joined as a unitary part. The rear piece 12 bearing the conical sealing portion 9 contains a plurality of longitudinal preliminary combining passages 14, 14$^a$, two being sufficient. The passage 14 has a longitudinal restricted oxygen inlet port 15 at its rear end, leading from the groove 10. The passage 14$^a$ has a relatively large longitudinal oxygen inlet port 15$^a$, preferably the full diameter of the passage, leading from the same groove. A single acetylene inlet port 16$^a$ leads from the groove 11 laterally inward to the passage 14$^a$; and a plurality of acetylene inlet ports 16, for example three, each of substantially the same size as the port 16$^a$, lead inward from said groove to the passage 14. The ports 16, 16$^a$ are proportioning ports, that is to say in conjunction with the acetylene pressure determined for the particular size of tip they determine the total flow of acetylene to the flame exit. Thus, the effective areas of the oxygen ports for the two passages are different, and the same is true of the acetylene ports, the arrangement being such that the combined stream which flows through the passage 14 contains a substantial excess of acetylene, while that in the passage 14ª has a substantial excess of oxygen. Further, the proportions are such that the total of the streams will produce a final mixture of the desired proportional composition. This particular combination of ports is preferred as being most advantageous in a tip of the form shown, but other, equivalent combinations may be employed.

The acetylene ports 16, 16ª all being of the same size can be in substantially direct communication with the supply conduit, through the groove 11. This might also be the case as to the oxygen inlet ports; but where these ports are of different sizes, as shown, it is not convenient to proportion the total oxygen flow by means of them, and for this purpose I preferably employ a common restricted oxygen proportioning port 17, leading diagonally from the rear extremity of the tip to the rear groove 10. This port is also advantageous as its delivery end can be nearer the restricted oxygen inlet port 15 than the large port 15ª.

The portion 13 of the tip contains an enlarged common mixing chamber 18, into which the passages 14, 14ª deliver. Said passages may converge as shown, some advantage being secured thereby; but they may be said to be substantially parallel. At the front of the tip, leading from the mixing chamber is a flame bore exit 22. This passage is of a diameter appropriate for the size of flame desired, and the mixing chamber is enlarged with reference thereto. Said chamber is near enough to the flame orifice so that a back-fire will pass to the chamber and there produce an explosion, which momentarily checks the flow in the preliminary combining passages 14, 14ª and goes no farther, the mixtures in these passages because of their proportions being incapable of back-firing, or at least not readily back-firing. The normal flow is then resumed and the flame is re-established at the exit. Both the normal and this occasional operation of the torch can be improved by baffling the gases in the mixing chamber. A variety of baffling arrangements may be employed, as for example a plug 19 containing numerous perforations 20.

The invention is not limited to a single flame exit from the mixing chamber, as it is also applicable to multiple jet torches.

What I claim as new is:

1. An oxyacetylene or like torch, characterized by means for bringing the two gases together in a plurality of streams of different composition proportions and means for combining said streams within the torch to form a mixture of the desired proportions.

2. An oxyacetylene or like torch, characterized by means having ports and passages designed to bring the two gases together in a plurality of streams, respectively oxidizing and reducing, so as to be substantially non-flashing.

3. An oxyacetylene or like torch having supply conduits for the two gases, a plurality of preliminary combining passages in parallel relation, means for conducting and introducing the gases from the supply conduits to said preliminary combining passages in different proportions, and a common mixing chamber wherein the preliminary mixtures of different proportional composition combine to form a mixture of the proportions desired for the flame.

4. An oxyacetylene or like torch having supply conduits for the two gases, a plurality of preliminary combining passages in substantially parallel relation, means for conducting and introducing the gases from the supply conduits to said preliminary combining passages in different proportions, a flame exit, and an enlarged mixing chamber intermediate the flame exit and the preliminary combining passages.

5. An oxyacetylene or like torch having supply conduits for the two gases, a plurality of preliminary combining passages in substantially parallel relation, means for conducting and introducing the gases from the supply conduits to said preliminary combining passages in different proportions, a flame exit, an enlarged mixing chamber intermediate the flame exit and the preliminary combining passages, and means for baffling the gases in the mixing chamber.

6. An oxyacetylene or like torch having supply conduits for the two gases, a plurality of preliminary combining passages in substantially parallel relation, a common mixing chamber intermediate said passages and the flame exit, oxygen and acetylene inlet ports to said passages, the effective area of the oxygen ports being relatively large for one part of the passages and relatively small for the other part, and vice versa as to the acetylene ports, and a common proportioning port intermediate one of the supply conduits and the corresponding inlet ports of the preliminary combining passages.

7. A replaceable part for oxyacetylene and like torches containing a plurality of preliminary combining passages with inlet ports for the two kinds of gases thereto, the inlet ports of different passages being differently proportioned in such manner that in one part of the passages one gas and in the other part the other gas is in excess, while the total forms the desired proportional mixture for the flame.

8. A replaceable tip for oxyacetylene and like torches having its rear portion formed for sealing contact with the part of the torch containing the supply conduits, and containing a plurality of sets of inlet ports for the two kinds of gases in its sealing portion, a plurality of preliminary combining passages to which said sets of inlet ports pertain, a common mixing chamber, and a flame exit, the inlet ports of different passages being differently proportioned so that the oxygen is substantially in excess in one and the acetylene in another, the proportions being such that the desired mixture results in the common mixing chamber.

9. A replaceable part for oxyacetylene or like torches having its rear portion formed for sealing contact with the part of the torch containing the supply conduits, inlet ports for the two kinds of gases in its sealing portion, and a plurality of preliminary combining passages delivering to a common mixing chamber, there being sets of inlet ports for the two kinds of gases to said passages differently proportioned so that the oxygen is in excess in one passage and the acetylene in another, and a common proportioning port controlling the flow of one of the gases to the corresponding inlet ports of all the passages.

10. A replaceable part for oxyacetylene or like torches having its rear portion formed for sealing contact with the part of the torch containing the supply conduits, inlet ports for the two kinds of gases in its sealing portion, and a plurality of preliminary combining passages delivering to a common mixing chamber, there being sets of inlet ports for the two kinds of gases to said passages differently proportioned so that the oxygen is in excess in one passage and the acetylene in another, and a common proportioning port controlling the flow of one of the gases to the corresponding inlet ports of all the passages, the inlet ports supplied from this proportioning port being of different sizes, while the inlet ports for the other kind of gas are of substantially the same size but different in number for the respective passages.

11. A replaceable part for oxyacetylene or like torches having its rear portion formed for sealing contact with the part of the torch containing the supply conduits, with two grooves in such sealing portion and a common proportioning port delivering into one of said grooves, said interchangeable part further containing a plurality of preliminary combining passages delivering to a common mixing chamber, and sets of inlet ports from the two grooves to the respective passages, the inlet ports from the groove supplied by said common proportioning port being of different sizes, while the inlet ports from the other groove are different in number for the respective passages.

12. A method of controlling the gases in oxyacetylene and like torches which comprises preliminarily combining the gases in separate streams which are respectively oxidizing and reducing, and thereafter and prior to the delivery into the atmosphere combining said streams into a mixture of the desired proportions.

13. A method of controlling the gases in oxyacetylene and like torches which comprises preliminarily combining the gases in separate streams which are respectively oxidizing and reducing, and thereafter expanding and commingling said streams and maintaining a body of explosive mixture accessible to the flame exit.

FRANCIS JOHN NAPOLITAN.